United States Patent
Ohashi et al.

(10) Patent No.: US 11,600,413 B2
(45) Date of Patent: Mar. 7, 2023

(54) R—FE—B SINTERED MAGNET AND PRODUCTION METHOD THEREFOR

(71) Applicant: Shin-Etsu Chemical Co., Ltd., Tokyo (JP)

(72) Inventors: Tetsuya Ohashi, Echizen (JP); Koichi Hirota, Echizen (JP); Hajime Nakamura, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 913 days.

(21) Appl. No.: 16/462,674

(22) PCT Filed: Nov. 28, 2017

(86) PCT No.: PCT/JP2017/042535
§ 371 (c)(1),
(2) Date: May 21, 2019

(87) PCT Pub. No.: WO2018/101239
PCT Pub. Date: Jun. 7, 2018

(65) Prior Publication Data
US 2020/0082962 A1  Mar. 12, 2020

(30) Foreign Application Priority Data
Dec. 2, 2016  (JP) .............................. JP2016-235198

(51) Int. Cl.
*H01F 1/057* (2006.01)
*H01F 41/02* (2006.01)
(Continued)

(52) U.S. Cl.
CPC .............. *H01F 1/0577* (2013.01); *B22F 3/24* (2013.01); *C22C 38/001* (2013.01);
(Continued)

(58) Field of Classification Search
CPC ............... H01F 1/0577; H01F 41/0266; H01F 41/0293; B22F 3/24; B22F 3/00;
(Continued)

(56) References Cited

U.S. PATENT DOCUMENTS

2004/0094237 A1  5/2004  Nomura et al.
2013/0271248 A1*  10/2013  Nagata .................... C22C 38/16
427/127

(Continued)

FOREIGN PATENT DOCUMENTS

EP  3076408 A1  10/2016
JP  2003-510467 A  3/2003

(Continued)

OTHER PUBLICATIONS

International Search Report dated Mar. 6, 2018, issued in counterpart application No. PCT/JP2017/042535, w/English translation (5 pages).

(Continued)

*Primary Examiner* — Humera N. Sheikh
*Assistant Examiner* — Kevin Ct Li
(74) *Attorney, Agent, or Firm* — WHDA, LLP

(57) ABSTRACT

R—Fe—B sintered magnet has a main phase containing $R_2(Fe,(Co))_{14}B$ intermetallic compound and a grain boundary phase. The inter-particle grain boundary includes an expanded width part that is surrounded by a narrow width part at which the inter-particle width is 10 nm or less and that has a structure distended in the inter-particle width direction as compared with the grain boundary width of the narrow width part; the inter-particle width at the expanded width part is at least 30 nm; Fe/R ratio in the expanded width part is 0.01-2.5; the main phase includes, in the surface part thereof, an HR-rich phase represented by $(R',HR)_2(Fe,(Co))_{14}B$ (R' represents rare-earth elements excluding Dy, (Continued)

Tb, and Ho, and that essentially include Nd; and HR represents Dy, Tb, and Ho); the contained amount of HR in the HR-rich phase is higher than that in the central part of the main phase.

9 Claims, 1 Drawing Sheet

(51) Int. Cl.
- *B22F 3/24* (2006.01)
- *C22C 38/16* (2006.01)
- *C22C 38/14* (2006.01)
- *C22C 38/10* (2006.01)
- *C22C 38/02* (2006.01)
- *C22C 38/06* (2006.01)
- *C22C 38/00* (2006.01)

(52) U.S. Cl.
CPC .......... *C22C 38/002* (2013.01); *C22C 38/005* (2013.01); *C22C 38/02* (2013.01); *C22C 38/06* (2013.01); *C22C 38/10* (2013.01); *C22C 38/14* (2013.01); *C22C 38/16* (2013.01); *H01F 41/0266* (2013.01); *B22F 2003/248* (2013.01); *B22F 2301/35* (2013.01); *C22C 2202/02* (2013.01)

(58) Field of Classification Search
CPC .......... B22F 2003/248; B22F 2301/35; C22C 38/001; C22C 38/002; C22C 38/005; C22C 38/02; C22C 38/06; C22C 38/10; C22C 38/14; C22C 38/16; C22C 33/02; C22C 2202/02; C21D 6/00

See application file for complete search history.

(56) References Cited

U.S. PATENT DOCUMENTS

| | | | |
|---|---|---|---|
| 2014/0132377 A1 | 5/2014 | Nakajima et al. | |
| 2014/0191831 A1 | 7/2014 | Yamazaki et al. | |
| 2014/0290803 A1* | 10/2014 | Kato .................... | H01F 1/0577 420/83 |
| 2016/0042847 A1 | 2/2016 | Nishiuchi et al. | |
| 2016/0042848 A1 | 2/2016 | Kuniyoshi et al. | |
| 2016/0189838 A1 | 6/2016 | Nishiuchi et al. | |
| 2016/0284452 A1 | 9/2016 | Horikita et al. | |

FOREIGN PATENT DOCUMENTS

| | | |
|---|---|---|
| JP | 3997413 B2 | 10/2007 |
| JP | 2013-236071 A | 11/2013 |
| JP | 2014-130888 A | 7/2014 |
| JP | 2014-132628 A | 7/2014 |
| JP | 2014-146788 A | 8/2014 |
| JP | 5572673 B2 | 8/2014 |
| JP | 2014-209546 A | 11/2014 |
| JP | 2016-184720 A | 10/2016 |
| WO | 2014/157448 A1 | 10/2014 |
| WO | 2014/157451 A1 | 10/2014 |
| WO | 2015/022945 A1 | 2/2015 |

OTHER PUBLICATIONS

Written Opinion dated Mar. 6, 2018, issued in counterpart application No. PCT/JP2017/042535 (4 pages).

Extended (supplementary) Search Report dated Jun. 9, 2020, issued in counterpart EP Application No. 17875271.3 (8 pages).

* cited by examiner

R—FE—B SINTERED MAGNET AND PRODUCTION METHOD THEREFOR

TECHNICAL FIELD

This invention relates to an R—Fe—B base sintered magnet having a high coercivity and a method for preparing the same.

BACKGROUND ART

While Nd—Fe—B sintered magnets, referred to as Nd magnets, hereinafter, are regarded as the functional material necessary for energy saving and performance improvement, their application range and production volume are expanding every year. Since the automotive application assumes service in a hot environment, the Nd magnets incorporated in driving motors and power steering motors in hybrid vehicles and electric vehicles must have high coercivity as well as high remanence. The Nd magnets, however, tend to experience a substantial drop of coercivity at elevated temperature. Then the coercivity at room temperature must be preset fully high in order to insure an acceptable coercivity at service temperature.

As the means for increasing the coercivity of Nd magnets, it is effective to substitute Dy or Tb for part of Nd in $Nd_2Fe_{14}B$ compound as main phase. For these elements, there are short reserves, the mining areas amenable to commercial operation are limited, and the constant supply is affected by geopolitical risks. These factors indicate the risk that the price is unstable or largely fluctuates. Under the circumstances, in order that R—Fe—B magnets adapted for high-temperature service find a wider market, a new approach or magnet composition capable of increasing coercivity while minimizing the content of Dy and Tb is needed. From this standpoint, several methods are already proposed.

For example, JP 3997413 (Patent Document 1) discloses an R—Fe—B base sintered magnet consisting essentially of 12-17 at % of R (wherein R stands for at least two of rare earth elements inclusive of yttrium and essentially contains Nd and Pr), 0.1-3 at % of Si, 5-5.9 at % of B, up to 10 at % of Co, and the balance of Fe (with the proviso that up to 3 at % of Fe may be substituted by at least one element selected from among Al, Ti, V, Cr, Mn, Ni, Cu, Zn, Ga, Ge, Zr, Nb, Mo, In, Sn, Sb, Hf, Ta, W, Pt, Au, Hg, Pb, and Bi), containing an intermetallic compound $R_2(Fe,(Co),Si)_{14}B$ as main phase, and exhibiting a coercivity of at least 10 kOe. Further, the magnet is free of a boron-rich phase and contains at least 1 vol % based on the entire magnet of an R—Fe(Co)—Si grain boundary phase consisting essentially of 25-35 at % of R, 2-8 at % of Si, up to 8 at % of Co, and the balance of Fe. After sintering or heat treatment following sintering, the sintered magnet is cooled at a rate of 0.1 to 5° C./min at least in a temperature range from 700° C. to 500° C., or cooled in multiple stages including holding at a certain temperature for at least 30 minutes on the way of cooling, for thereby generating the R—Fe(Co)—Si grain boundary phase in the matrix.

JP-A 2003-510467 (Patent Document 2) discloses a Nd—Fe—B alloy with a low boron content, a sintered magnet based on the alloy, and a method for preparing the same. The sintered magnet is prepared by sintering the alloy and cooling the sintered product below 300° C. The step of cooling down to 800° C. is at an average cooling rate $\Delta T1/\Delta t1 < 5 K/min$.

JP 5572673 (Patent Document 3) discloses an R-T-B magnet comprising a main phase of $R_2Fe_{14}B$ and a grain boundary phase. A portion of the grain boundary phase is an R-rich phase containing more R than the main phase, and the remaining portion is a transition metal-rich phase having a lower rare earth concentration and a higher transition metal concentration than the main phase. The R-T-B rare earth sintered magnet is prepared by sintering at 800 to 1,200° C. and heat treatment at 400 to 800° C.

JP-A 2014-132628 (Patent Document 4) discloses an R-T-B rare earth sintered magnet comprising a grain boundary phase containing an R-rich phase having a total atomic concentration of rare earth elements of at least 70 at % and a ferromagnetic transition metal-rich phase having a total atomic concentration of rare earth elements of 25 to 35 at %, wherein an area proportion of the transition metal-rich phase is at least 40% of the grain boundary phase. The sintered magnet is prepared by shaping an alloy material into a compact, sintering the compact at 800 to 1,200° C., and a plurality of heat treatments, i.e., first heat treatment of heating at a temperature of 650 to 900° C., cooling to 200° C. or below, and second heat treatment of heating at 450 to 600° C.

JP-A 2014-146788 (Patent Document 5) discloses an R-T-B rare earth sintered magnet comprising a main phase of $R_2Fe_{14}B$ and a grain boundary phase containing more R than the main phase, wherein the main phase of $R_2Fe_{14}B$ has an axis of easy magnetization parallel to c-axis, crystal grains of the main phase of $R_2Fe_{14}B$ are of elliptic shape elongated in a direction perpendicular to the c-axis, and the grain boundary phase contains an R-rich phase having a total atomic concentration of rare earth elements of at least 70 at % and a transition metal-rich phase having a total atomic concentration of rare earth elements of 25 to 35 at %. It is also described that the preparation method involves sintering at 800 to 1,200° C. and subsequent heat treatment at 400 to 800° C. in an argon atmosphere.

JP-A 2014-209546 (Patent Document 6) discloses a rare earth magnet comprising a main phase of $R_2T_{14}B$ and an intergranular grain boundary phase between two adjacent $R_2T_{14}B$ main phase crystal grains, wherein the intergranular grain boundary phase has a thickness of 5 nm to 500 nm and is composed of a phase having different magnetism from ferromagnetism. In this rare earth magnet, the intergranular grain boundary phase is formed of a compound which contains element T, but does not become ferromagnetic. Thus, the intergranular grain boundary phase contains a transition metal element and element M such as Al, Ge, Si, Sn or Ga. By further adding Cu to the rare earth magnet, a crystalline phase with a $La_6Co_{11}Ga_3$-type crystal structure may be evenly and broadly formed as the intergranular grain boundary phase, and a thin R—Cu layer may be formed at the interface between the $La_6Co_{11}Ga_3$-type intergranular grain boundary phase and the $R_2T_{14}B$ main phase crystal grains. As a result, the interface of the main phase can be passivated, the generation of strain due to a lattice mismatch be suppressed, and reverse magnetic domain-generating nuclei be inhibited. The method of preparing the magnet involves sintering, heat treatment at a temperature of 500 to 900° C., and cooling at a cooling rate of at least 100° C./min, especially at least 300° C./min.

WO 2014/157448 (Patent Document 7) and WO 2014/157451 (Patent Document 8) disclose an R-T-B sintered magnet comprising a main phase of $Nd_2Fe_{14}B$ compound and an intergranular grain boundary phase between two main phase grains, with a thickness of 5 to 30 nm, and having a grain boundary triple junction surrounded by three or more main phase grains.

PRIOR ART DOCUMENTS

Patent Documents

Patent Document 1: JP 3997413
Patent Document 2: JP-A 2003-510467
Patent Document 3: JP 5572673
Patent Document 4: JP-A 2014-132628
Patent Document 5: JP-A 2014-146788
Patent Document 6: JP-A 2014-209546
Patent Document 7: WO 2014/157448
Patent Document 8: WO 2014/157451

SUMMARY OF INVENTION

Technical Problem

Under the circumstances discussed above, there exists a need for an R—Fe—B base sintered magnet which exhibits a high coercivity despite a minimal content of Dy, Tb and Ho.

An object of the invention, which has been made under the above-mentioned circumstances, is to provide a novel R—Fe—B base sintered magnet exhibiting a high coercivity, and a method for preparing the same.

Solution to Problem

Making extensive investigations to solve the above problem, the inventors have found that an R—Fe—B base sintered magnet exhibits a high coercivity, the R—Fe—B base sintered magnet having a composition consisting essentially of 12 to 17 at % of R which is one or more elements selected from rare earth elements inclusive of yttrium and essentially contains Nd, 0.1 to 3 at % of $M_1$ which is at least one element selected from among Si, Al, Mn, Ni, Cu, Zn, Ga, Ge, Pd, Ag, Cd, In, Sn, Sb, Pt, Au, Hg, Pb, and Bi, 0.05 to 0.5 at % of $M_2$ which is at least one element selected from among Ti, V, Cr, Zr, Nb, Mo, Hf, Ta, and W, 4.8+2×m to 5.9+2×m at % of B wherein m is at % of element $M_2$, up to 10 at % of Co, up to 0.5 at % of C, up to 1.5 at % of O, up to 0.5 at % of N, and the balance of Fe, and comprising a main phase containing an intermetallic compound $R_2(Fe,(Co))_{14}B$ and a grain boundary phase, wherein the grain boundary phase includes an intergranular grain boundary which includes narrow portions each having an intergranular width of up to 10 nm and broad portions each of which is flanked by the narrow portions and structured to expand in the intergranular width direction beyond the grain boundary width of the narrow portion, the broad portion has an intergranular width of at least 30 nm, an atomic ratio (Fe/R) of Fe to R in the broad portion is from 0.01 to 2.5, the main phase contains an HR rich phase of $(R',HR)_2(Fe,(Co))_{14}B$ at its surface portion, wherein R' is one or more elements selected from rare earth elements inclusive of yttrium and exclusive of Dy, Tb and Ho, and essentially contains Nd, and HR is at least one element selected from Dy, Tb and Ho, the HR rich phase having a higher HR content than the HR content of the main phase at its center.

The inventors have also found that such an R—Fe—B base sintered magnet, that is, an R—Fe—B base sintered magnet having a composition consisting essentially of 12 to 17 at % of R which is at least one element selected from rare earth elements inclusive of yttrium and essentially contains Nd, 0.1 to 3 at % of $M_1$ which is one or more elements selected from among Si, Al, Mn, Ni, Cu, Zn, Ga, Ge, Pd, Ag, Cd, In, Sn, Sb, Pt, Au, Hg, Pb, and Bi, 0.05 to 0.5 at % of $M_2$ which is at least one element selected from among Ti, V, Cr, Zr, Nb, Mo, Hf, Ta, and W, 4.8+2×m to 5.9+2×m at % of B wherein m is at % of element $M_2$, up to 10 at % of Co, up to 0.5 at % of C, up to 1.5 at % of O, up to 0.5 at % of N, and the balance of Fe, and comprising a main phase of $R_2(Fe,(Co))_{14}B$ intermetallic compound, can be prepared by a method comprising the steps of providing an alloy fine powder of a predetermined composition, compression shaping the alloy fine powder in an applied magnetic field into a compact, sintering the compact at a temperature of 900 to 1,250° C. into a sintered body, cooling the sintered body to a temperature of 400° C. or below, high-temperature heat treatment including placing a metal, compound or intermetallic compound containing HR which is at least one element selected from Dy, Tb and Ho, on the surface of the sintered body, heating at a temperature from more than 950° C. to 1,100° C., for causing grain boundary diffusion of HR into the sintered body, and cooling to a temperature of 400° C. or below, medium-temperature heat treatment after the high-temperature heat treatment, including heating at a temperature of 600 to 750° C., and low-temperature heat treatment after the medium-temperature heat treatment, including heating at a temperature of 400 to 550° C., and cooling to a temperature of 300° C. or below. There is obtained a high coercivity R—Fe—B base sintered magnet comprising a main phase and a grain boundary phase, the grain boundary phase being formed between crystal grains of the main phase and containing a (R',HR)—Fe(Co)-$M_1$ phase consisting of 25 to 35 at % of (R',HR), 2 to 8 at % of $M_1$, up to 8 at % of Co, and the balance of Fe, wherein R' is one or more elements selected from rare earth elements inclusive of yttrium and exclusive of Dy, Tb and Ho, and essentially contains Nd, and HR is at least one element selected from Dy, Tb and Ho. The invention is predicated on these findings.

Accordingly, the invention provides an R—Fe—B base sintered magnet and a method for preparing the same, as defined below.

1. An R—Fe—B base sintered magnet having a composition consisting essentially of 12 to 17 at % of R which is one or more elements selected from rare earth elements inclusive of yttrium and essentially contains Nd, 0.1 to 3 at % of $M_1$ which is at least one element selected from among Si, Al, Mn, Ni, Cu, Zn, Ga, Ge, Pd, Ag, Cd, In, Sn, Sb, Pt, Au, Hg, Pb, and Bi, 0.05 to 0.5 at % of $M_2$ which is at least one element selected from among Ti, V, Cr, Zr, Nb, Mo, Hf, Ta, and W, 4.8+2×m to 5.9+2×m at % of B wherein m is at % of element $M_2$, up to 10 at % of Co, up to 0.5 at % of C, up to 1.5 at % of O, up to 0.5 at % of N, and the balance of Fe, and comprising a main phase containing an intermetallic compound $R_2(Fe,(Co))_{14}B$ and a grain boundary phase, wherein the grain boundary phase includes an intergranular grain boundary which includes narrow portions each having an intergranular width of up to 10 nm and broad portions each of which is flanked by the narrow portions and structured to expand in the intergranular width direction beyond the grain boundary width of the narrow portion, the broad portion has an intergranular width of at least 30 nm, the broad portion has an atomic ratio (Fe/R) of Fe to R of 0.01 to 2.5, the main phase contains an HR rich phase of $(R',HR)_2(Fe,(Co))_{14}B$ at its surface portion, wherein R' is one or more elements selected from rare earth elements inclusive of yttrium and exclusive of Dy, Tb and Ho, and essentially contains Nd, and HR is at least one element selected from Dy, Tb and Ho, the HR rich phase having a higher HR content than the HR content of the main phase at its center.

2. The R—Fe—B base sintered magnet of 1 wherein the broad portion has a ratio (L/W) of the maximum length L in the extending direction of the intergranular grain boundary to the intergranular width W which is up to 8.

3. The R—Fe—B base sintered magnet of 1 or 2 wherein the broad portion has a maximum cross-sectional area of at least 7,000 nm$^2$.

4. The R—Fe—B base sintered magnet of any one of 1 to 3 wherein as viewed in a cross section of the magnet, a proportion of the total area of the broad portions relative to the overall area of the magnet is at least 0.1%.

5. The R—Fe—B base sintered magnet of any one of 1 to 4 wherein the magnet has a HR content distributed from a surface portion toward the interior, the HR content of the surface portion being higher than the HR content of the interior.

6. The R—Fe—B base sintered magnet of any one of 1 to 5 wherein the HR rich phase is non-uniformly formed in the surface portion of the main phase.

7. The R—Fe—B base sintered magnet of any one of 1 to 6 wherein the Nd content of the HR rich phase is up to 0.8 time the Nd content of the main phase at its center.

8. The R—Fe—B base sintered magnet of any one of 1 to 7 wherein as viewed in a cross section at a depth of 200 μm from the surface of the sintered magnet, the area of the HR rich phase is at least 2% of the overall area of the main phase.

9. A method for preparing an R—Fe—B base sintered magnet, comprising the steps of:

providing an alloy fine powder having a composition consisting essentially of 12 to 17 at % of R which is one or more elements selected from rare earth elements inclusive of yttrium and essentially contains Nd, 0.1 to 3 at % of $M_1$ which is at least one element selected from among Si, Al, Mn, Ni, Cu, Zn, Ga, Ge, Pd, Ag, Cd, In, Sn, Sb, Pt, Au, Hg, Pb, and Bi, 0.05 to 0.5 at % of $M_2$ which is at least one element selected from among Ti, V, Cr, Zr, Nb, Mo, Hf, Ta, and W, 4.8+2×m to 5.9+2×m at % of B wherein m is at % of element $M_2$, up to 10 at % of Co, up to 0.5 at % of C, up to 1.5 at % of O, up to 0.5 at % of N, and the balance of Fe, compression shaping the alloy fine powder in an applied magnetic field into a compact, sintering the compact at a temperature of 900 to 1,250° C. into a sintered body, cooling the sintered body to a temperature of 400° C. or below, high-temperature heat treatment including placing a metal, compound or intermetallic compound containing HR which is at least one element selected from Dy, Tb and Ho, on the surface of the sintered body, heating at a temperature from more than 950° C. to 1,100° C., for causing grain boundary diffusion of HR into the sintered body, and cooling to a temperature of 400° C. or below, medium-temperature heat treatment after the high-temperature heat treatment, including heating at a temperature of 600 to 750° C., and low-temperature heat treatment after the medium-temperature heat treatment, including heating at a temperature of 400 to 550° C., and cooling to a temperature of 300° C. or below.

Advantageous Effects of Invention

The R—Fe—B base sintered magnet of the invention has a high coercivity despite a minimal content of Dy, Tb and Ho.

DESCRIPTION OF EMBODIMENTS

Figure 1:
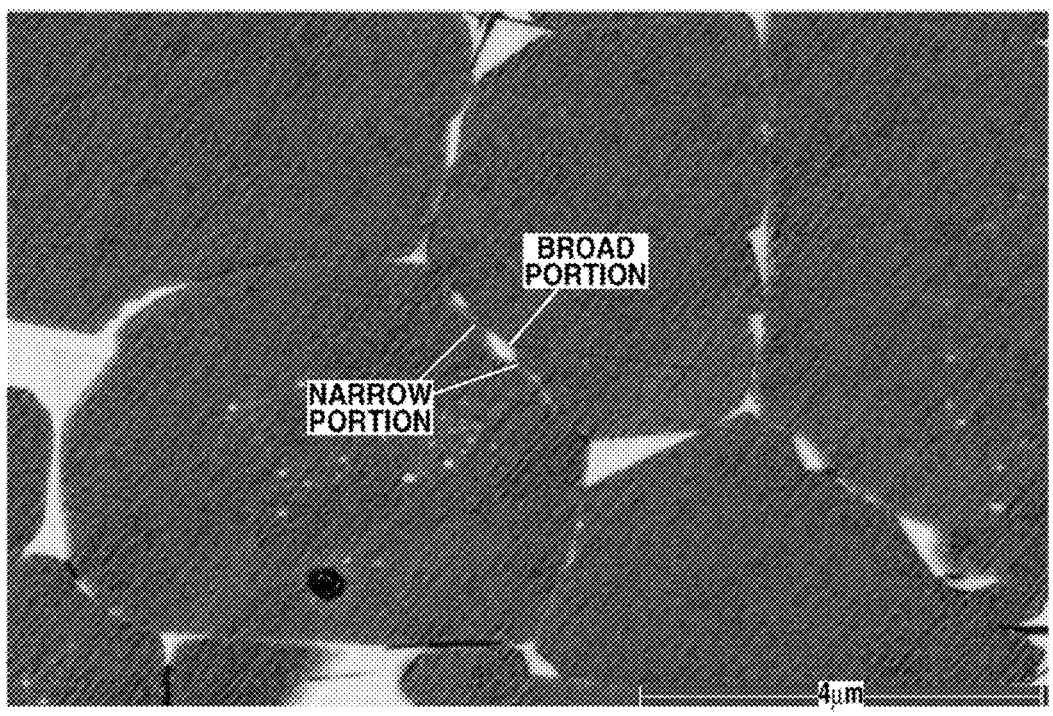
FIG. 1 is an image showing the interior structure of the sintered magnet in Example 1, as observed under a scanning electron microscope (SEM).

Now the invention is described in detail.

First, the magnet composition of the invention is described. The R—Fe—B base sintered magnet has a composition consisting essentially of 12 to 17 at % of R, 0.1 to 3 at % of $M_1$, 0.05 to 0.5 at % of $M_2$, 4.8+2×m to 5.9+2×m at % of B wherein m is a content (at %) of element $M_2$, up to 10 at % of Co, up to 0.5 at % of C (carbon), up to 1.5 at % of O (oxygen), up to 0.5 at % of N (nitrogen), and the balance of Fe, with incidental impurities being optionally contained.

Herein, R is one or more elements selected from rare earth elements inclusive of yttrium and essentially contains Nd. The preferred rare earth elements other than Nd include Pr, La, Ce, Gd, Dy, Tb, and Ho, more preferably Pr, Dy, Tb, and Ho, with Pr being most preferred. The content of R is 12 to 17 at %, preferably at least 13 at % and up to 16 at %. If the content of R is less than 12 at %, the magnet has an extremely reduced coercivity. If the content of R exceeds 17 at %, the magnet has a low remanence (residual magnetic flux density) Br. Preferably essential element Nd accounts for at least 60 at %, especially at least 70 at %, based on the total of R. When R contains at least one element of Pr, La, Ce and Gd as the rare earth element other than Nd, an atomic ratio of Nd to at least one element of Pr, La, Ce and Gd is preferably from 75/25 to 85/15. When R contains Pr as the rare earth element other than Nd, didymium which is a mixture of Nd and Pr may be used, and an atomic ratio of Nd to Pr may be from 77/23 to 83/17, for example.

When R contains at least one element of Dy, Tb and Ho, the total content of Dy, Tb and Ho is preferably up to 20 at %, more preferably up to 10 at %, even more preferably up to 5 at %, and most preferably up to 3 at %, and at least 0.06 at %, based on the total of R. The total content of Dy, Tb and Ho relative to the overall magnet composition is preferably up to 3 at %, more preferably up to 1.5 at %, even more preferably up to 1 at %, and most preferably up to 0.4 at %, and at least 0.01 at %. When at least one element of Dy, Tb and Ho is diffused via grain boundary diffusion, the amount of element diffused is preferably up to 0.7 at %, more preferably up to 0.4 at % and at least 0.05 at %.

$M_1$ is at least one element selected from among Si, Al, Mn, Ni, Cu, Zn, Ga, Ge, Pd, Ag, Cd, In, Sn, Sb, Pt, Au, Hg, Pb, and Bi. $M_1$ is an element necessary to form the (R', HR)—Fe(Co)-$M_1$ phase to be described later. The inclusion of the predetermined content of $M_1$ ensures to form the (R',HR)—Fe(Co)-$M_1$ phase in a stable manner. The content of $M_1$ is 0.1 to 3 at %, preferably at least 0.5 at % and up to 2.5 at %. If the content of $M_1$ is less than 0.1 at %, the (R',HR)—Fe(Co)-$M_1$ phase is present in the grain boundary phase in too low a proportion to improve coercivity. If the content of $M_1$ exceeds 3 at %, the magnet has poor squareness and a low remanence Br.

$M_2$ is at least one element selected from among Ti, V, Cr, Zr, Nb, Mo, Hf, Ta and W. $M_2$ is added for the purposes of inhibiting growth of abnormal grains during sintering and forming a boride in a stable manner. The content of $M_2$ is 0.05 to 0.5 at %. The addition of $M_2$ enables sintering at relatively high temperature during magnet preparation, leading to improvements in squareness and magnetic properties.

The content of boron (B) is $(4.8+2\times m)$ to $(5.9+2\times m)$ at %, preferably at least $(4.9+2\times m)$ at % and up to $(5.7+2\times m)$ at %, wherein m is a content (at %) of element $M_2$. Differently stated, since the content of element $M_2$ in the magnet composition is in the range of 0.05 to 0.5 at %, the range of B content varies with a particular content of element $M_2$ in this range. Specifically the content of B is from 4.9 at % to 6.9 at %, more specifically at least 5.0 at % and up to 6.7 at %. In particular, the upper limit of B content is crucial. If the B content exceeds $(5.9+2\times m)$ at %, the $(R',HR)$—Fe(Co)-$M_1$ phase is not formed at the grain boundary, and instead, an $R_{11}Fe_4B_4$ compound phase or $(R',HR)_{11}Fe_4B_4$ compound phase, which is so-called B-rich phase, is formed. If the B-rich phase is present in the magnet, the coercivity of the magnet is not fully increased. If the B content is less than $(4.8+2\times m)$ at %, the percent volume of the main phase is reduced, and magnetic properties are degraded.

CO is optional. For the purpose of improving Curie temperature and corrosion resistance, Co may substitute for part of Fe. When Co is contained, the Co content is preferably up to 10 at %, more preferably up to 5 at %. A Co content in excess of 10 at % is undesirable because of a substantial loss of coercivity. More preferably the Co content is up to 10 at %, especially up to 5 at % based on the total of Fe and Co. The expression "Fe,(Co)" or "Fe(Co)" is used to indicate two cases where cobalt is contained and not contained.

The contents of carbon, oxygen and nitrogen are desirably as low as possible and more desirably nil. However, such elements are inevitably introduced during the magnet preparation process. A carbon (C) content of up to 0.5 at %, especially up to 0.4 at %, an oxygen (O) content of up to 1.5 at %, especially up to 1.2 at %, and a nitrogen (N) content of up to 0.5 at %, especially up to 0.3 at % are permissible. The content of Fe is the balance, preferably at least 70 at %, more preferably at least 75 at % and up to 85 at %, more preferably up to 80 at % based on the overall magnet composition.

It is permissible that the magnet contains other elements such as H, F, Mg, P, S, Cl and Ca as the incidental impurity in an amount of up to 0.1% by weight based on the total weight of constituent elements and impurities. The content of incidental impurities is desirably as low as possible.

The R—Fe—B base sintered magnet of the invention is preferably obtained by applying the grain boundary diffusion process of diffusing a rare earth element from the surface of a sintered body. For example, when the grain boundary diffusion process of diffusing HR which is at least one element selected from Dy, Tb and Ho from the surface of a sintered body is applied, the HR content (or HR concentration) has such a distribution from a surface portion toward the interior of the sintered body that the HR content (or HR concentration) in the surface portion of the R—Fe—B base sintered magnet is higher than the HR content (or HR concentration) in the interior of the R—Fe—B base sintered magnet which is disposed inside the surface portion.

The R—Fe—B base sintered magnet preferably has an average crystal grain size of up to 6 μm, more preferably up to 5.5 μm, and even more preferably up to 5 μm, and at least 1.5 μm, more preferably at least 2 μm. The average size of crystal grains may be controlled by adjusting the average particle size of alloy powder during fine milling. The average size of crystal grains is measured by the following procedure, for example. First, a section of sintered magnet is polished to mirror finish, immersed in an etchant such as vilella solution (mixture of glycerol:nitricacid:hydrochloric acid=3:1:2) for selectively etching the grain boundary phase, and observed under a laser microscope. On analysis of the image, the cross-sectional area of individual grains is determined, from which the diameter of an equivalent circle is computed. Based on the data of area fraction of each grain size, the average grain size is determined. The average grain size is typically an average for about 2,000 grains taken from images of 20 different areas.

Preferably the R—Fe—B base sintered magnet has a remanence Br of at least 11 kG (1.1 T), more preferably at least 11.5 kG (1.15 T), and even more preferably at least 12 kG (1.2 T) at room temperature (~23° C.). Also preferably the R—Fe—B base sintered magnet has a coercivity Hcj of at least 10 kOe (796 kA/m), more preferably at least 14 kOe (1,114 kA/m), and even more preferably at least 16 kOe (1,274 kA/m) at room temperature (~23° C.). When a squareness is evaluated as Hk–HcJ, wherein Hk is a magnetic field corresponding to 90% of the remanence Br in the second quadrant of a magnetization curve, preferably the sintered magnet has a squareness of at least –4 kOe (318 kA/m), more preferably at least –2.5 kOe (199 kA/m), and even more preferably at least –2 kOe (159 kA/m) at room temperature (~23° C.).

In the structure of the inventive magnet, a main phase (crystal grains) and a grain boundary phase are present. The main phase constituting crystal grains contains a phase of $R_2(Fe,(Co))_{14}B$ intermetallic compound. The compound may be expressed as $R_2Fe_{14}B$ when cobalt-free, and as $R_2(Fe,Co)_{14}B$ when it contains cobalt.

The main phase contains an HR rich phase which contains a phase: $(R',HR)_2(Fe,(Co))_{14}B$ wherein R' is one or more elements selected from rare earth elements inclusive of yttrium and exclusive of Dy, Tb and Ho, and essentially contains Nd, and HR is at least one element selected from Dy, Tb and Ho. The compound may be expressed as $(R',HR)_2Fe_{14}B$ when cobalt-free, and as $(R',HR)_2(Fe,Co)_{14}B$ when it contains cobalt. The HR rich phase is a phase of intermetallic compound having a higher HR content than the HR content of the main phase at its center. Of elements R', the rare earth elements other than Nd are preferably Pr, La, Ce and Gd, with Pr being most preferred. The HR rich phase is formed at a surface portion of the main phase.

Preferably the HR rich phase is non-uniformly formed at the surface portion of the main phase. The HR rich phase may be formed throughout the surface portion of the main phase, for example, so as to cover the overall portion (i.e., interior) of the main phase other than the HR rich phase. In this case, the HR rich phase preferably has a non-uniform thickness, and includes a thickest portion and a thinnest portion. A thickness ratio of the thickest portion to the thinnest portion is preferably at least 1.5, more preferably at least 2, and even more preferably at least 3.

In the HR rich phase, HR substitutes for the site occupied by R. The HR rich phase has a Nd content which is preferably up to 0.8 time (80%), more preferably up to 0.75 time (75%), and even more preferably up to 0.7 time (70%) of the Nd content at the center of the main phase. If the Nd content of the HR rich phase is above the range, the coercivity enhancing effect of HR may become insufficient.

In a preferred embodiment, the area of the HR rich phase as evaluated in a cross section taken at a depth of 200 μm from the surface of the sintered magnet (e.g., the diffusion surface during grain boundary diffusion treatment to be described later) is at least 2%, preferably at least 4%, and more preferably at least 5% of the overall area of the main phase. If the areal proportion of the HR rich phase is less than the range, the coercivity enhancing effect of HR may become insufficient. Further preferably, the areal proportion of the HR rich phase is up to 40%, more preferably up to 30%, and even more preferably up to 25%. If the areal proportion of the HR rich phase exceeds the range, the remanence Br may become low.

The structure of the inventive magnet further contains a grain boundary phase formed among crystal grains of the main phase. The grain boundary phase contains a (R',HR)—Fe(Co)-$M_1$ phase. The phase may be expressed as (R',HR)—Fe-$M_1$ when cobalt-free, and as (R',HR)—FeCo-$M_1$ when it contains cobalt.

Preferably the grain boundary phase is formed outside crystal grains of the main phase. In the structure of the magnet, (R',HR)—Fe(Co)-$M_1$ phase is preferably present in an amount of at least 1% by volume. If the amount of (R',HR)—Fe(Co)-$M_1$ phase is less than 1% by volume, a high coercivity may not be obtained. The amount of (R',HR)—Fe(Co)-$M_1$ phase is preferably up to 20% by volume, more preferably up to 10% by volume. If the amount of (R',HR)—Fe(Co)-$M_1$ phase exceeds 20% by volume, the outcome may be a substantial drop of remanence Br.

The (R',HR)—Fe(Co)-$M_1$ phase is a phase of a compound containing only Fe when Co is not contained and a compound containing Fe and Co when Co is contained and is considered as an intermetallic compound phase having a crystal structure of space group I4/mcm. Exemplary phases include $(R',HR)_6(Fe,(Co))_{13}(M_1)$ phases such as $(R',HR)_6(Fe,(Co))_{13}Si$ phase, $(R',HR)_6(Fe,(Co))_{13}Ga$ phase, and $(R',HR)_6(Fe,(Co))_{13}Al$ phase. The (R',HR)—Fe(Co)-$M_1$ phase is distributed so as to surround crystal grains of the main phase, whereby adjacent main phases are magnetically divided, leading to an improvement in coercivity.

The (R',HR)—Fe(Co)-$M_1$ phase is considered as a phase of R—Fe(Co)-$M_1$ wherein a part of R is HR. The (R',HR)—Fe(Co)-$M_1$ phase has a HR content which is preferably up to 30 at % based on the total of R' and HR. In general, the R—Fe(Co)-$M_1$ phase can form a stable compound phase with a light rare earth element such as La, Pr or Nd, and when a part of the rare earth element is replaced by a heavy rare earth element (HR) such as Dy, Tb or Ho, it forms a stable phase until the HR content reaches 30 at %. If the HR content exceeds 30 at %, a ferromagnetic phase such as $(R',HR)_1Fe_3$ phase will form during the low-temperature heat treatment to be described later, leading to declines of coercivity and squareness. The lower limit of the HR content is typically at least 0.1 at %, though not critical.

In the (R',HR)—Fe(Co)-$M_1$ phase, $M_1$ preferably consists of:

0.5 to 50 at % of Si and the balance of at least one element selected from Al, Mn, Ni, Cu, Zn, Ga, Ge, Pd, Ag, Cd, In, Sn, Sb, Pt, Au, Hg, Pb, and Bi;
1.0 to 80 at % of Ga and the balance of at least one element selected from Si, Al, Mn, Ni, Cu, Zn, Ge, Pd, Ag, Cd, In, Sn, Sb, Pt, Au, Hg, Pb, and Bi; or
0.5 to 50 at % of Al and the balance of at least one element selected from Si, Mn, Ni, Cu, Zn, Ga, Ge, Pd, Ag, Cd, In, Sn, Sb, Pt, Au, Hg, Pb, and Bi.

These elements form the aforementioned intermetallic compounds (specifically $(R',HR)_6(Fe,(Co))_{13}(M_1)$ phases such as $(R',HR)_6(Fe,(Co))_{13}Si$ phase, $(R',HR)_6(Fe,(Co))_{13}Ga$ phase, and $(R',HR)_6(Fe,(Co))_{13}Al$ phase) in a stable manner, and provide mutual substitution at $M_1$ site. Even when a composite compound with an element at $M_1$ site is formed, no significant difference in magnetic properties is observed, but in practice, there are achieved stabilization of quality due to a minimized variation of magnetic properties and a cost reduction due to a reduced amount of expensive element added.

In the R—Fe—B base sintered magnet, the grain boundary phase is preferably distributed so as to surround individual crystal grains of the main phase at intergranular grain boundaries and grain boundary triple junctions. More preferably, individual crystal grains each are separated from adjacent crystal grains by the grain boundary phase. For example, with a focus on individual crystal grains of the main phase, a structure in which a main phase grain serves as core and the grain boundary phase encloses the grain as shell (i.e., structure similar to the so-called core/shell structure) is preferred. With this structure, adjacent main phase grains are magnetically divided, leading to a further improvement in coercivity. To insure magnetic division between main phase grains, the narrowest portion of the grain boundary phase interposed between two adjacent crystal grains preferably has a thickness of at least 10 nm, especially at least 20 nm and up to 500 nm, especially up to 300 nm. If the width of grain boundary phase is narrower than 10 nm, a sufficient coercivity enhancing effect due to magnetic division may not be obtained. The narrowest portion of the grain boundary phase interposed between two adjacent crystal grains preferably has an average thickness of at least 20 nm, especially at least 30 nm and up to 300 nm, especially up to 200 nm.

The surface coverage of main phase grains with the grain boundary phase is preferably at least 50%, more preferably at least 60%, and even more preferably at least 70%. Even the entire surface of main phase grains may be covered with the grain boundary phase.

The grain boundary phase should preferably contain a (R',HR)—Fe(Co)-$M_1$ phase consisting essentially of 25 to 35 at % of R, 2 to 8 at % of $M_1$, up to 8 at % (i.e., 0 at % or from more than 0 at % to 8 at %) of Co, and the balance of Fe. This composition may be quantified by an analytic technique such as electron probe microanalyzer (EPMA). The $M_1$ site may be mutually substituted by a plurality of elements. Preferably the (R',HR)—Fe(Co)-$M_1$ phase is present in the form of an amorphous phase and/or nanocrystalline phase having a grain size of up to 10 nm, preferably less than 10 nm. As crystallization of (R',HR)—Fe(Co)-$M_1$ phase proceeds, the (R',HR)—Fe(Co)-$M_1$ phase may agglomerate at grain boundary triple junctions, and as a result, the width of intergranular grain boundary phase may become narrow or discontinuous, resulting in a magnet with a low coercivity.

Preferably the grain boundary phase includes, in an intergranular grain boundary, narrow portions each having an intergranular width of up to 10 nm and broad portions (e.g., of sump-like shape) each of which is flanked by the narrow portions and structured to expand in the intergranular width direction beyond the grain boundary width of the narrow portion. Also preferably, an atomic ratio (Fe/R) of Fe to R in the broad portion of the intergranular grain boundary is at least 0.01, more preferably at least 0.02 and up to 2.5, more preferably up to 2.2.

In a low-boron-type magnet with a low boron content having an R—Fe(Co)-$M_1$ phase such as an (R',HR)—Fe(Co)-$M_1$ phase formed as a grain boundary phase, a phase having lower magnetism than the main phase (e.g., a R—Fe(Co)-$M_1$ phase such as R—Fe(Co)—Cu phase) precipitates along the intergranular grain boundary. As a result of main phase grains being covered with the grain boundary phase containing such a phase, the magnetic interaction between main phase grains is reduced whereby coercivity is improved. It is believed that each of the constituent elements of the R—Fe(Co)-$M_1$ phase is mainly supplied from grain boundary triple junctions.

Although the reason is not well understood, it is believed with respect to the R—Fe—B base sintered magnet of the invention that the grain boundary phase, specifically the broad portion in the intergranular grain boundary can reserve a more amount of each of the constituent elements of an R—Fe(Co)-$M_1$ phase. The presence of the broad portion facilitates formation of the R—Fe(Co)-$M_1$ phase in the intergranular grain boundary, which contributes to an improvement in coercivity.

Low-boron-type magnets in which an R—Fe(Co)-$M_1$ phase is formed, but no broad portions are not present along the intergranular grain boundary may have a lower coercivity. In contrast, the R—Fe—B base sintered magnet in which broad portions are present along the intergranular grain boundary as in the invention exhibits a high coercivity. In the low-temperature treatment to be described later, it has a significant influence on the achievement of squareness and coercivity whether or not broad portions are present along the intergranular grain boundary. Heavy rare earth elements are difficult to form an R—Fe(Co)-$M_1$ phase as compared to light rare earth elements. It is believed that if the grain boundary diffusion process of diffusing heavy rare earth element HR from the surface of a sintered body is applied to the low-temperature treatment to form an R—Fe(Co)-$M_1$ phase, the reaction to form the R—Fe(Co)-$M_1$ phase, especially (R',HR)—Fe(Co)-$M_1$ phase may take place with difficulty along the intergranular grain boundary, especially at a position remote from the grain boundary triple junction which is the main source for each of the constituent elements of the R—Fe(Co)-$M_1$ phase because the heavy rare earth element HR is present in a surface portion of the main phase at a high concentration.

Although the reason is not well understood, it is believed with respect to the R—Fe—B base sintered magnet of the invention that each of the constituent elements of an (R',HR)—Fe(Co)-$M_1$ phase is more effectively supplied not only from the grain boundary triple junction, but also from the broad portions of the intergranular grain boundary. Thus, even when heavy rare earth element HR is present at the main phase surface in a high concentration as a result of grain boundary diffusion, formation of the (R',HR)—Fe(Co)-$M_1$ phase which is necessary for the magnetic division effect proceeds more efficiently whereby coercivity is improved.

Preferably the broad portion of the intergranular grain boundary has an intergranular width of at least 30 nm, more preferably at least 50 nm, even more preferably at least 70 nm and up to 500 nm, more preferably up to 300 nm, even more preferably up to 200 nm. Also preferably, the broad portion of the intergranular grain boundary has a ratio (L/W) of the maximum length L in the extending direction of the intergranular grain boundary (e.g., a direction orthogonal to the intergranular width direction) to the intergranular width W, which is up to 8, more preferably up to 6 and at least 0.1, more preferably at least 0.3. Also preferably, the broad portion of the intergranular grain boundary has a maximum cross-sectional area of at least 7,000 $nm^2$, more preferably at least 8,000 $nm^2$, even more preferably at least 10,000 $nm^2$ and up to 200,000 $nm^2$, more preferably up to 150,000 $nm^2$, even more preferably up to 120,000 $nm^2$.

In a cross section of the magnet, a proportion of the total area of the broad portions relative to the overall area of the magnet is preferably at least 0.1%, more preferably at least 0.12%, even more preferably at least 0.14% and up to 1%, more preferably up to 0.9%, even more preferably up to 0.7%.

If broad portions of the intergranular grain boundary are too small or too less, the supply of each element may be short, failing to achieve sufficient coercivity. If broad portions of the intergranular grain boundary are too large or too much, the proportion of the main phase in the overall magnet may become low with the risk of remanence being reduced.

Next, the method for preparing the R—Fe—B base sintered magnet according to the invention is described.

The method for preparing the R—Fe—B base sintered magnet involves several steps which are generally the same as in ordinary powder metallurgy methods. Specifically, the method involves the step of providing an alloy fine powder having a predetermined composition (including the steps of melting feed materials to form a source alloy and grinding the source alloy), the step of compression shaping the alloy fine powder in an applied magnetic field into a compact, the step of sintering the compact into a sintered body, and the step of cooling the sintered body.

In the melting step, feed materials including metals and alloys are weighed so as to meet the predetermined composition, for example, a composition consisting essentially of 12 to 17 at % of R which is one or more elements selected from rare earth elements inclusive of yttrium and essentially contains Nd and preferably Pr as well, 0.1 to 3 at % of $M_1$ which is at least one element selected from among Si, Al, Mn, Ni, Cu, Zn, Ga, Ge, Pd, Ag, Cd, In, Sn, Sb, Pt, Au, Hg, Pb, and Bi, 0.05 to 0.5 at % of $M_2$ which is at least one element selected from among Ti, V, Cr, Zr, Nb, Mo, Hf, Ta, and W, 4.8+2×m to 5.9+2×m at % of B wherein m is at % of element $M_2$, up to 10 at % of Co, up to 0.5 at % of C, up to 1.5 at % of O, up to 0.5 at % of N, and the balance of Fe, usually, so as to meet the predetermined composition being free of carbon, oxygen and nitrogen. The feed materials are melted in vacuum or an inert gas atmosphere, preferably inert gas atmosphere, typically Ar gas, by high-frequency heating, and cooled into a source alloy. In the composition of feed materials including metals and alloys, R may or may not contain at least one element (HR) selected from Dy, Tb and Ho. For casting of source alloy, either a standard melt casting method (such as casting the melt into a flat mold or book mold) or strip casting method may be used. If primary crystals of α-Fe are left in the cast alloy, the alloy may be heat treated in vacuum or an inert gas atmosphere, typically Ar gas at 700 to 1,200° C. for at least 1 hour, for thereby making the microscopic structure uniform and erasing the α-Fe phase.

The step of grinding the source alloy includes coarse grinding such as mechanical crushing on a Brown mill or the like or hydrogen decrepitation to an average particle size of at least 0.05 mm and up to 3 mm, especially up to 1.5 mm. The preferred coarse grinding step is hydrogen decrepitation when the alloy is prepared by strip casting. The coarse grinding step is followed by fine milling such as jet milling with the aid of high pressure nitrogen, for example, into an alloy fine powder having an average particle size of at least 0.2 μm, especially at least 0.5 μm and up to 30 μm, specifically up to 20 μm, especially up to 10 μm. If desired, a lubricant or another additive may be added to the source alloy in one or both of coarse grinding and fine milling steps.

Also applicable to the preparation of the alloy powder is a so-called two-alloy process involving separately preparing a mother alloy approximate to the $R_2$-$T_{14}$-$B_1$ composition (wherein T is Fe or Fe and Co) and a rare earth (R)-rich alloy serving as sintering aid, crushing, mixing the mother alloy and sintering aid, and milling the mixed powder by the aforementioned technique. The sintering aid alloy may be prepared by the casting technique mentioned above or melt-spun technique.

In the shaping step using a compression shaping machine, the alloy fine powder is compression shaped into a compact under an applied magnetic field, for example, of 5 kOe (398 kA/m) to 20 kOe (1,592 kA/m), for orienting the axis of easy magnetization of alloy particles. The shaping is preferably performed in vacuum or inert gas atmosphere, especially nitrogen or argon gas atmosphere, to prevent alloy particles from oxidation. In the sintering step, the compact from the shaping step is sintered into a sintered body. The sintering temperature is preferably at least 900° C., more preferably at least 1,000° C., especially at least 1,050° C. and up to 1,250° C., more preferably up to 1,150° C., especially up to 1,100° C., and the sintering time is typically 0.5 to 5 hours. After sintering, the sintered body is cooled to a temperature of preferably 400° C. or below, more preferably 300° C. or below, even more preferably 200° C. or below. The cooling rate is preferably at least 1° C./min, more preferably at least 5° C./min and up to 100° C./min, more preferably up to 50° C./min until the upper limit of the temperature range is reached although the cooling rate is not particularly limited. If necessary, the sintered body is aged, for example, at 400 to 600° C. for 0.5 to 50 hours, and thereafter cooled typically to normal temperature.

At this point, the sintered body (sintered magnet body) may be subjected to heat treatment. This heat treatment step preferably includes two stages of heat treatment: high-temperature heat treatment step of heating the sintered body, which has been cooled to a temperature of 400° C. or below, at a temperature of at least 700° C., especially at least 800° C. and up to 1,100° C., especially up to 1,050° C. and cooling to a temperature of 400° C. or below again, and subsequent low-temperature heat treatment step of heating the sintered body at a temperature of 400 to 600° C. and cooling to a temperature of 300° C. or below, especially 200° C. or below. The heat treatment atmosphere is preferably vacuum or an inert gas atmosphere, typically Ar gas.

The heating rate of the high-temperature heat treatment is preferably at least 1° C./min, especially at least 2° C./min and up to 20° C./min, especially up to 10° C./min though not particularly limited. The holding time of the high-temperature heat treatment is preferably at least 1 hour, and typically up to 10 hours, preferably up to 5 hours. After heating, the sintered body is cooled to a temperature of 400° C. or below, more preferably 300° C. or below, and even more preferably 200° C. or below. The cooling rate is preferably at least 1° C./min, more preferably at least 5° C./min and up to 100° C./min, more preferably up to 50° C./min until the upper limit of the temperature range is reached although the cooling rate is not particularly limited.

In the low-temperature heat treatment step following the high-temperature heat treatment step, the once cooled sintered body is heated at a temperature of at least 400° C., preferably at least 450° C. and up to 600° C., preferably up to 550° C. The heating rate of the low-temperature heat treatment is preferably at least 1° C./min, especially at least 2° C./min and up to 20° C./min, especially up to 10° C./min though not particularly limited. The holding time at the temperature of the low-temperature heat treatment after heating is preferably at least 0.5 hour, especially at least 1 hour, and up to 50 hours, especially up to 20 hours. The cooling rate is preferably at least 1° C./min, more preferably at least 5° C./min and up to 100° C./min, more preferably up to 80° C./min, even more preferably up to 50° C./min until the upper limit of the temperature range is reached although the cooling rate is not particularly limited. After the heat treatment, the sintered body is cooled typically to normal temperature.

Various parameters in the high- and low-temperature heat treatments may be adjusted as appropriate in their ranges defined above, depending on variations associated with the preparation process excluding the high- and low-temperature heat treatments, for example, the species and content of element M1, the concentration of impurities, especially impurities introduced from the atmosphere gas during the preparation process, and sintering conditions.

In the practice of the invention, the HR rich phase containing $(R',HR)_2(Fe,(Co))_{14}B$ phase and the grain boundary phase containing $(R',HR)$—Fe(Co)-$M_1$ phase may be formed by a grain boundary diffusion process. In the grain boundary diffusion process, the sintered compact is machined into a sintered body of desired shape or size approximate to the final product by cutting or surface grinding, if necessary, a metal, compound or intermetallic compound containing an element HR wherein HR is at least one element selected from Dy, Tb and Ho, for example, in powder or thin film form, is placed on the surface of the sintered body to enclose the sintered body, and treatment is carried out to introduce HR element in the metal, compound or intermetallic compound from the surface to the bulk of the sintered body via the grain boundary phase. Notably, in the portion of the main phase other than the HR rich phase, HR element may form a solid solution via grain boundary diffusion, but preferably does not form a solid solution at the center of the main phase. On the other hand, it is preferred that rare earth elements other than HR element do not form a solid solution in the main phase via grain boundary diffusion.

The grain boundary diffusion process of introducing HR element in the magnet body from its surface into its bulk along the grain boundary phase may be (1) a process of placing a powder of a HR-containing metal, compound or intermetallic compound on the surface of the sintered body and heat treating in vacuum or inert gas atmosphere (e.g., dip coating process), (2) a process of forming a thin film of a HR-containing metal, compound or intermetallic compound on the surface of the sintered body in high vacuum and heat treating in vacuum or inert gas atmosphere (e.g., sputtering process), or (3) a process of heating a HR-containing metal, compound or intermetallic compound in high vacuum to create a HR-containing vapor phase, and supplying and diffusing the HR element into the sintered body from the vapor phase (e.g., vapor diffusion process).

Of these, processes (1) and (2) are preferred, with process (1) being most preferred.

Suitable HR-containing metals, compounds or intermetallic compounds include single metal of HR, alloys of HR, oxides, halides, acid halides, hydroxides, carbides, carbonates, nitrides, hydrides, and borides of HR, and mixtures thereof, and intermetallic compounds of HR and transition metals such as Fe, Co and Ni wherein part of the transition metal may be substituted by at least one element selected from among Si, Al, Ti, V, Cr, Mn, Cu, Zn, Ga, Ge, Pd, Ag, Cd, Zr, Nb, Mo, In, Sn, Sb, Hf, Ta, W, Pt, Au, Hg, Pb, and Bi.

The thickness of the HR rich phase may be controlled by adjusting the amount of HR element added or the amount of HR element diffused into the sintered body bulk, or the temperature and time of grain boundary diffusion treatment.

In order to form the HR rich phase containing (R',HR)$_2$(Fe,(Co))$_{14}$B phase and the grain boundary phase containing (R',HR)—Fe(Co)-M$_1$ phase via grain boundary diffusion, a metal, compound or intermetallic compound, for example, in powder or thin film form, is placed on the surface of the sintered body, which has been cooled after sintering or after heat treatment prior to grain boundary diffusion process. The sintered body is subjected to high-temperature heat treatment including heating at a temperature of more than 950° C., preferably at least 960° C., more preferably at least 975° C. and up to 1,100° C., preferably up to 1,050° C., more preferably up to 1,030° C. for causing grain boundary diffusion of HR element into the sintered body, and then cooling to a temperature of 400° C. or below, preferably 300° C. or below, more preferably 200° C. or below. The heat treatment atmosphere is preferably in vacuum or an inert gas atmosphere such as Ar gas.

If the heating temperature is below the range, the coercivity enhancing effect may become insufficient. If the heating temperature is above the range, a lowering of coercivity due to grain growth may occur. The heating temperature is preferably equal to or higher than the peritectic point (decomposition temperature) of (R',HR)—Fe(Co)-M$_1$ phase. The high-temperature stability of (R',HR)—Fe(Co)-M$_1$ phase varies with the species of M$_1$, and the peritectic point at which (R',HR)—Fe(Co)-M$_1$ phase forms is different with the species of M$_1$. Specifically, the peritectic point is 640° C. for M$_1$=Cu, 750° C. for M$_1$=Al, 850° C. for M$_1$=Ga, 890° C. for M$_1$=Si, 960° C. for M$_1$=Ge, and 890° C. for M$_1$=In. The heating rate is preferably at least 1° C./min, especially at least 2° C./min and up to 20° C./min, especially up to 10° C./min though not particularly limited. The heating time is preferably at least 0.5 hour, more preferably at least 1 hour and up to 50 hours, more preferably up to 20 hours.

The cooling rate after heating is preferably at least 1° C./min, more preferably at least 5° C./min and up to 100° C./min, more preferably up to 50° C./min until the upper limit of the temperature range is reached although the cooling rate is not particularly limited. If the cooling rate is less than the range, the (R',HR)—Fe(Co)-M$_1$ phase may segregate at grain boundary triple junctions, exacerbating magnetic properties. If the cooling rate exceeds 100° C./min, the segregation of (R',HR)—Fe(Co)-M$_1$ phase during the cooling step is inhibited, but the squareness of the sintered magnet can be degraded.

The high-temperature heat treatment is followed by a medium-temperature heat treatment including heating at a temperature of at least 600° C., preferably at least 630° C. and up to 750° C., preferably up to 730° C. The medium-temperature heat treatment may include, after the heating step, the step of cooling to a temperature of 400° C. or below, preferably 300° C. or below, or the heating step may directly transfer to the low-temperature heat treatment to be described later. The heat treatment atmosphere is preferably vacuum or an inert gas atmosphere such as Ar gas. If the heating temperature is below 600° C., the coercivity enhancing effect may become insufficient. If the heating temperature exceeds 750° C., the squareness available after the subsequent low-temperature heat treatment may be degraded.

The heating rate of the medium-temperature heat treatment is preferably at least 1° C./min, especially at least 2° C./min and up to 20° C./min, especially up to 10° C./min though not particularly limited. The holding time at the temperature of the medium-temperature heat treatment after heating is preferably at least 15 minutes, especially at least 30 minutes and preferably up to 50 hours, especially up to 20 hours. The cooling rate after heating is preferably at least 1° C./min, more preferably 5° C./min and up to 100° C./min, more preferably up to 80° C./min, even more preferably up to 50° C./min until the upper limit of the cooling temperature range of the medium-temperature heat treatment or the heating temperature of the low-temperature heat treatment to be described later is reached although the cooling rate is not particularly limited.

The medium-temperature heat treatment is followed by a low-temperature heat treatment including heating at a temperature of at least 400° C., preferably at least 410° C., more preferably at least 430° C. and up to 550° C., preferably up to 530° C., more preferably up to 490° C., and then cooling to a temperature of 300° C. or below, preferably 200° C. or below. The heat treatment atmosphere is preferably in vacuum or an inert gas atmosphere such as Ar gas.

It is effective for forming (R',HR)—Fe(Co)-M$_1$ phase as the grain boundary phase that the heating temperature is lower than the peritectic point of (R',HR)—Fe(Co)-M$_1$ phase. If the heating temperature is below 400° C., the reaction rate of forming (R',HR)—Fe(Co)-M$_1$ phase may become very slow. If the heating temperature exceeds 600° C., the reaction rate of forming (R',HR)—Fe(Co)-M$_1$ phase becomes so fast that (R',HR)—Fe(Co)-M$_1$ grain to boundary phase may substantially segregate at grain boundary triple junctions, adversely affecting magnetic properties.

The heating rate of the low-temperature heat treatment is preferably at least 1° C./min, especially at least 2° C./min and up to 20° C./min, especially up to 10° C./min though not particularly limited. The holding time at the temperature of the low-temperature heat treatment after heating is preferably at least 0.5 hour, more preferably at least 1 hour and up to 50 hours, more preferably up to 20 hours. The cooling rate after heating is preferably at least 0.1° C./min, more preferably at least 0.5° C./min and up to 100° C./min, more preferably up to 80° C./min, most preferably up to 50° C./min until the upper limit of the temperature range is reached although the cooling rate is not particularly limited. After the heat treatment, the sintered body is cooled typically to normal temperature.

EXAMPLES

Reference Examples, Examples and Comparative Examples are given below for further illustrating the invention although the invention is not limited thereto.

Reference Examples 1 to 3

A ribbon form alloy was prepared by the strip casting technique, specifically by using Nd or didymium (mixture of Nd and Pr) as rare earth element, electrolytic iron, cobalt, metals or alloys as element M$_1$ and element M$_2$, and ferroboron (Fe—B alloy), weighing them so as to meet the desired composition, melting the mix in an Ar gas atmosphere on a high-frequency induction furnace, and strip casting the melt onto a water-cooled copper chill roll. The ribbon form alloy had a thickness of about 0.2 to 0.3 mm.

The ribbon form alloy was powdered by hydrogen decrepitation, that is, hydrogen absorption at normal temperature and subsequent heating at 600° C. in vacuum for hydrogen desorption. To the resulting coarse powder, 0.07 wt % of stearic acid as lubricant was added and mixed. The mixture of the coarse powder and lubricant was finely milled on a jet mill using nitrogen stream, into a fine powder having an average particle size of about 3 μm.

In an inert gas atmosphere, a mold of a compacting machine was charged with the fine powder. While a magnetic field of 15 kOe (1.19 MA/m) was applied for orientation, the powder was compression molded in a direction perpendicular to the magnetic field. The compact was sintered in vacuum at 1,050-1,100° C. for 3 hours, cooled to 200° C. or below, and aged at 450-530° C. for 2 hours, yielding a sintered body (sintered magnet body). Table 1 shows the composition of the sintered body and Table 3 shows its magnetic properties. It is noted that a parallelepiped block of 6 mm×6 mm×2 mm was cut out of the sintered body at the center and evaluated for magnetic properties.

Example 1 and Comparative Example 1

The sintered body obtained in Reference Example 1 was machined into a parallelepiped block of 20 mm×20 mm×2.2 mm. It was immersed in a slurry of terbium oxide particles with an average particle size of 0.5 μm in ethanol at a weight fraction of 50%, and dried, forming a coating of terbium oxide on the surface of the sintered body. The thus coated sintered body was subjected to high-temperature heat treatment including heating in vacuum at the holding temperature for the holding time shown in Table 2, and then cooling down to 200° C. at the cooling rate shown in Table 2. Thereafter, the sintered body was subjected to medium-temperature heat treatment including heating at the holding temperature shown in Table 2 for 1 hour, and then cooling down to 200° C. at the cooling rate shown in Table 2. Further, the sintered body was subjected to low-temperature heat treatment including heating at the holding temperature shown in Table 2 for 2 hours, and then cooling down to 200° C. at the cooling rate shown in Table 2, yielding a sintered magnet. Table 1 shows the composition of this sintered magnet. Table 3 shows its magnetic properties and structural characteristics, i.e., (A) the proportion of the area of the HR rich phase relative to the overall area of the main phase, as evaluated in a cross section taken at a depth of 200 μm from the magnet surface, (B) the proportion of the total area of broad portions relative to the overall area of the magnet in a cross section of the magnet, and (C) the atomic ratio (Fe/R) of Fe to R in broad portions (the same applies hereinafter). It is noted that a parallelepiped block of 6 mm×6 mm×2 mm was cut out of the sintered magnet at the center and evaluated for magnetic properties. As compared with the sintered magnet of Comparative Example 1, the sintered magnet of Example 1, which was subjected to medium-temperature heat treatment and included a more proportion of broad portions, has to a high coercivity, indicating that this magnet has a better squareness as evaluated by Hk–HcJ.

Figure 2:
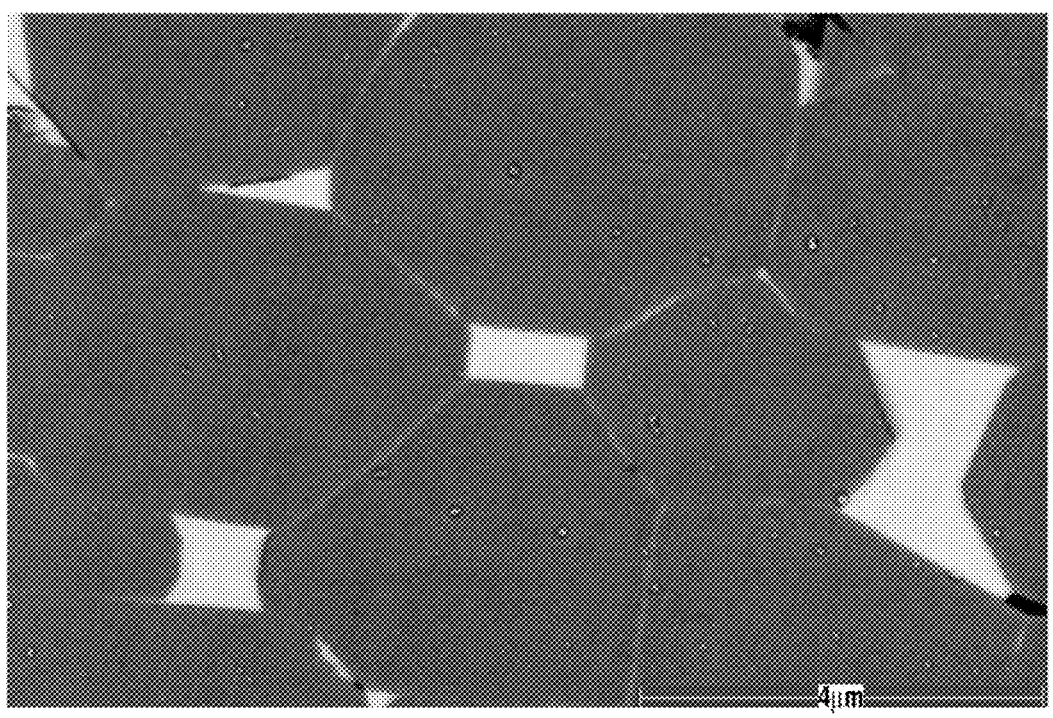
FIG. 2 is an image showing the interior structure of the sintered magnet in Comparative Example 1, as observed under a scanning electron microscope (SEM).

FIGS. 1 and 2 are images showing the interior structure of the sintered magnets in Example 1 and Comparative Example 1, as observed under a scanning electron microscope (SEM), respectively. In the image of Example 1, bright areas are observed along intergranular grain boundaries, indicating the distribution of numerous broad portions along the intergranular grain boundary. In the image of Comparative Example 1, some bright areas are observed along intergranular grain boundaries, but broad portions account for only a low proportion.

Examples 2 to 4 and Comparative Examples 2 and 3

The sintered body obtained in Reference Example 2 was machined into a parallelepiped block of 20 mm×20 mm×2.2 mm. It was immersed in a slurry of terbium oxide particles with an average particle size of 0.5 μm in ethanol at a weight fraction of 50%, and dried, forming a coating of terbium oxide on the surface of the sintered body. The thus coated sintered body was subjected to high-temperature heat treatment including heating in vacuum at the holding temperature for the holding time shown in Table 2, and then cooling down to 200° C. at the cooling rate shown in Table 2. Thereafter, the sintered body was subjected to medium-temperature heat treatment including heating at the holding temperature shown in Table 2 for 1 hour, and then cooling down to 200° C. at the cooling rate shown in Table 2. Further, the sintered body was subjected to low-temperature heat treatment including heating at the holding temperature shown in Table 2 for 2 hours, and then cooling down to 200° C. at the cooling rate shown in Table 2, yielding a sintered magnet. Table 1 shows the composition of these sintered magnets and Table 3 shows their magnetic properties and structural characteristics. It is noted that a parallelepiped block of 6 mm×6 mm×2 mm was cut out of the sintered magnet at the center and evaluated for magnetic properties. As compared with the sintered magnets of Comparative Examples, the sintered magnets of Examples, which were subjected to medium-temperature heat treatment and included a more proportion of broad portions, have a high coercivity, indicating that these magnets have a better squareness as evaluated by Hk–HcJ.

Example 5 and Comparative Example 4

The sintered body obtained in Reference Example 1 was machined into a parallelepiped block of 20 mm×20 mm×2.2 mm. It was immersed in a slurry of dysprosium oxide particles with an average particle size of 0.5 μm in ethanol at a weight fraction of 50%, and dried, forming a coating of dysprosium oxide on the surface of the sintered body. The thus coated sintered body was subjected to high-temperature heat treatment including heating in vacuum at the holding temperature for the holding time shown in Table 2, and then cooling down to 200° C. at the cooling rate shown in Table 2. Thereafter, the sintered body was subjected to medium-temperature heat treatment including heating at the holding temperature shown in Table 2 for 1 hour, and then cooling down to 200° C. at the cooling rate shown in Table 2. Further, the sintered body was subjected to low-temperature heat treatment including heating at the holding temperature shown in Table 2 for 2 hours, and then cooling down to 200° C. at the cooling rate shown in Table 2, yielding a sintered magnet. Table 1 shows the composition of this sintered magnet and Table 3 shows its magnetic properties and structural characteristics. It is noted that a parallelepiped block of 6 mm×6 mm×2 mm was cut out of the sintered magnet at the center and evaluated for magnetic properties. As compared with the sintered magnet of Comparative Example 4, the sintered magnet of Example 5, which was subjected to medium-temperature heat treatment and included a more proportion of broad portions, has a high coercivity.

TABLE 1

| at % | Nd | Pr | Dy | Tb | Fe | Co | B | Al | Cu | Zr | Si | Ga | O | N | C |
|---|---|---|---|---|---|---|---|---|---|---|---|---|---|---|---|
| Reference Example 1 | 11.6 | 2.9 | — | — | bal. | 0.5 | 5.4 | 0.3 | 0.3 | 0.07 | 0.1 | 0.7 | 0.77 | 0.09 | 0.30 |
| Reference Example 2 | 11.6 | 3.0 | — | — | bal. | 0.5 | 5.4 | 0.3 | 0.7 | 0.14 | 0.1 | 0.7 | 0.56 | 0.09 | 0.31 |
| Reference Example 3 | 11.6 | 3.0 | — | — | bal. | 0.5 | 5.5 | 0.3 | 0.7 | 0.14 | 0.3 | 0.4 | 0.61 | 0.09 | 0.30 |
| Example 1 | 11.3 | 2.8 | — | 0.3 | bal. | 0.5 | 5.4 | 0.3 | 0.5 | 0.07 | 0.1 | 0.7 | 0.75 | 0.09 | 0.30 |
| Comparative Example 1 | 11.3 | 2.8 | — | 0.3 | bal. | 0.5 | 5.4 | 0.3 | 0.5 | 0.07 | 0.1 | 0.7 | 0.72 | 0.09 | 0.32 |
| Example 2 | 11.4 | 2.9 | — | 0.3 | bal. | 0.5 | 5.4 | 0.3 | 0.7 | 0.14 | 0.1 | 0.7 | 0.59 | 0.10 | 0.31 |
| Example 3 | 11.4 | 2.9 | — | 0.3 | bal. | 0.5 | 5.4 | 0.3 | 0.7 | 0.14 | 0.1 | 0.7 | 0.58 | 0.10 | 0.30 |
| Example 4 | 11.4 | 2.9 | — | 0.3 | bal. | 0.5 | 5.4 | 0.3 | 0.7 | 0.14 | 0.1 | 0.7 | 0.60 | 0.09 | 0.32 |
| Comparative Example 2 | 11.4 | 2.9 | — | 0.3 | bal. | 0.5 | 5.4 | 0.3 | 0.7 | 0.14 | 0.1 | 0.7 | 0.58 | 0.10 | 0.30 |
| Comparative Example 3 | 11.4 | 2.9 | — | 0.3 | bal. | 0.5 | 5.4 | 0.3 | 0.7 | 0.14 | 0.1 | 0.7 | 0.60 | 0.09 | 0.30 |
| Example 5 | 11.3 | 2.8 | 0.2 | — | bal. | 0.5 | 5.4 | 0.3 | 0.5 | 0.07 | 0.1 | 0.7 | 0.75 | 0.09 | 0.29 |
| Comparative Example 4 | 11.3 | 2.8 | 0.2 | — | bal. | 0.5 | 5.4 | 0.3 | 0.5 | 0.07 | 0.1 | 0.7 | 0.76 | 0.09 | 0.30 |

TABLE 2

| | High-temperature heat treatment | | | Medium-temperature heat treatment | | Low-temperature heat treatment | |
|---|---|---|---|---|---|---|---|
| | Holding temperature (° C.) | Holding time (hr) | Cooling rate (° C./min) | Holding temperature (° C.) | Cooling rate (° C./min) | Holding temperature (° C.) | Cooling rate (° C./min) |
| Example 1 | 1,000 | 5 | 20 | 650 | 20 | 450 | 20 |
| Comparative Example 1 | 1,000 | 5 | 20 | — | — | 450 | 20 |
| Example 2 | 1,000 | 5 | 20 | 650 | 20 | 450 | 20 |
| Example 3 | 1,000 | 10 | 20 | 650 | 20 | 450 | 20 |
| Example 4 | 1,000 | 5 | 5 | 650 | 20 | 450 | 20 |
| Comparative Example 2 | 1,000 | 5 | 20 | — | — | 450 | 20 |
| Comparative Example 3 | 1,000 | 5 | 5 | — | — | 510 | 20 |
| Example 5 | 975 | 5 | 20 | 650 | 20 | 450 | 20 |
| Comparative Example 4 | 975 | 5 | 20 | — | — | 450 | 20 |

TABLE 3

| | Hcj (kOe) | Hk-Hcj (kOe) | (A) Proportion of HR rich phase (%) | (B) Proportion of broad portions (%) | (C) Fe/R in broad portion (atomic ratio) |
|---|---|---|---|---|---|
| Reference Example 1 | 18.8 | −0.9 | — | — | — |
| Reference Example 2 | 19.4 | −1.0 | — | — | — |
| Reference Example 3 | 19.0 | −0.9 | — | — | — |
| Example 1 | 27.0 | −1.2 | 7.1 | 0.45 | 0.23 |
| Comparative Example 1 | 26.5 | −2.1 | 7.0 | 0.04 | 0.25 |
| Example 2 | 27.6 | −1.3 | 7.6 | 0.34 | 0.16 |
| Example 3 | 28.2 | −1.3 | 8.0 | 0.25 | 0.17 |
| Example 4 | 27.4 | −1.3 | 7.3 | 0.19 | 0.32 |
| Comparative Example 2 | 26.5 | −2.0 | 7.1 | 0.04 | 0.17 |
| Comparative Example 3 | 26.3 | −11.7 | 6.9 | 0.07 | 0.20 |
| Example 5 | 23.4 | −1.1 | 5.2 | 0.15 | 0.25 |
| Comparative Example 4 | 22.4 | −1.2 | 4.5 | 0.04 | 0.16 |

Examples 6 to 9 and Comparative Examples 5 to 8

The sintered body obtained in Reference Example 3 was machined into a parallelepiped block of 20 mm×20 mm×2.2 mm. It was immersed in a slurry of terbium oxide particles with an average particle size of 0.5 μm in ethanol at a weight fraction of 50%, and dried, forming a coating of terbium oxide on the surface of the sintered body. The thus coated sintered body was subjected to high-temperature heat treatment including heating in vacuum at the holding temperature for the holding time shown in Table 5, and then cooling down to 200° C. at the cooling rate shown in Table 5. Thereafter, the sintered body was subjected to medium-temperature heat treatment including heating at the holding temperature shown in Table 5 for 1 hour, and then cooling down to 200° C. at the cooling rate shown in Table 5. Further, the sintered body was subjected to low-temperature heat treatment including heating at the holding temperature shown in Table 5 for 2 hours, and then cooling down to 200° C. at the cooling rate shown in Table 5, yielding a sintered magnet. Table 4 shows the composition of these sintered magnets and Table 6 shows their magnetic properties and structural characteristics. It is noted that a parallelepiped block of 6 mm×6 mm×2 mm was cut out of the sintered magnet at the center and evaluated for magnetic properties. As compared with the sintered magnets of Comparative Examples, the sintered magnets of Examples, which were subjected to medium-temperature heat treatment and included a more proportion of broad portions, have a high coercivity, indicating that these magnets have a better squareness as evaluated by Hk–HcJ.

TABLE 4

| at % | Nd | Pr | Dy | Tb | Fe | Co | B | Al | Cu | Zr | Si | Ga | O | N | C |
|---|---|---|---|---|---|---|---|---|---|---|---|---|---|---|---|
| Example 6 | 11.4 | 2.9 | — | 0.3 | bal. | 0.5 | 5.5 | 0.3 | 0.7 | 0.14 | 0.3 | 0.4 | 0.61 | 0.09 | 0.30 |
| Comparative Example 5 | 11.4 | 2.9 | — | 0.3 | bal. | 0.5 | 5.5 | 0.3 | 0.7 | 0.14 | 0.3 | 0.4 | 0.59 | 0.10 | 0.30 |
| Example 7 | 11.4 | 2.9 | — | 0.3 | bal. | 0.5 | 5.5 | 0.3 | 0.7 | 0.14 | 0.3 | 0.4 | 0.61 | 0.09 | 0.30 |
| Comparative Example 6 | 11.4 | 2.9 | — | 0.3 | bal. | 0.5 | 5.5 | 0.3 | 0.7 | 0.14 | 0.3 | 0.4 | 0.60 | 0.10 | 0.30 |
| Example 8 | 11.4 | 2.9 | — | 0.3 | bal. | 0.5 | 5.5 | 0.3 | 0.7 | 0.14 | 0.3 | 0.4 | 0.58 | 0.10 | 0.31 |
| Comparative Example 7 | 11.4 | 2.9 | — | 0.3 | bal. | 0.5 | 5.5 | 0.3 | 0.7 | 0.14 | 0.3 | 0.4 | 0.58 | 0.10 | 0.30 |
| Example 9 | 11.4 | 2.9 | — | 0.3 | bal. | 0.5 | 5.5 | 0.3 | 0.7 | 0.14 | 0.3 | 0.4 | 0.62 | 0.09 | 0.30 |
| Comparative Example 8 | 11.4 | 2.9 | — | 0.3 | bal. | 0.5 | 5.5 | 0.3 | 0.7 | 0.14 | 0.3 | 0.4 | 0.59 | 0.10 | 0.31 |

TABLE 5

| | High-temperature heat treatment | | | Medium-temperature heat treatment | | Low-temperature heat treatment | |
|---|---|---|---|---|---|---|---|
| | Holding temperature (° C.) | Holding time (hr) | Cooling rate (° C./min) | Holding temperature (° C.) | Cooling rate (° C./min) | Holding temperature (° C.) | Cooling rate (° C./min) |
| Example 6 | 1,000 | 10 | 20 | 650 | 20 | 410 | 20 |
| Comparative Example 5 | 1,000 | 10 | 20 | — | — | 410 | 20 |
| Example 7 | 1,000 | 10 | 20 | 650 | 20 | 450 | 20 |
| Comparative Example 6 | 1,000 | 10 | 20 | — | — | 450 | 20 |
| Example 8 | 1,000 | 10 | 20 | 650 | 20 | 490 | 20 |
| Comparative Example 7 | 1,000 | 10 | 20 | — | — | 490 | 20 |
| Example 9 | 1,000 | 10 | 20 | 650 | 20 | 530 | 20 |
| Comparative Example 8 | 1,000 | 10 | 20 | — | — | 530 | 20 |

TABLE 6

| | Hcj (kOe) | Hk-Hcj (kOe) | (A) Proportion of HR rich phase (%) | (B) Proportion of broad portions (%) | (C) Fe/R in broad portion (atomic ratio) |
|---|---|---|---|---|---|
| Example 6 | 27.8 | -1.1 | 6.8 | 0.19 | 0.20 |
| Comparative Example 5 | 25.1 | -1.4 | 6.5 | 0.03 | 0.32 |
| Example 7 | 28.1 | -1.4 | 7.5 | 0.21 | 0.18 |
| Comparative Example 6 | 27.3 | -1.5 | 7.8 | 0.06 | 0.22 |
| Example 8 | 27.6 | -1.2 | 7.7 | 0.18 | 0.19 |
| Comparative Example 7 | 26.0 | -3.1 | 8.1 | 0.05 | 0.26 |
| Example 9 | 27.0 | -1.0 | 7.2 | 0.19 | 0.23 |
| Comparative Example 8 | 27.0 | -1.5 | 7.1 | 0.07 | 0.20 |

The invention claimed is:

1. An R—Fe—B base sintered magnet having a composition consisting essentially of 12 to 17 at % of R which is two or more elements selected from rare earth elements inclusive of yttrium and essentially contains Nd, 0.1 to 3 at % of $M_1$ which is at least one element selected from among Si, Al, Mn, Ni, Cu, Zn, Ga, Ge, Pd, Ag, Cd, In, Sn, Sb, Pt, Au, Hg, Pb, and Bi, 0.05 to 0.5 at % of $M_2$ which is at least one element selected from among Ti, V, Cr, Zr, Nb, Mo, Hf, Ta, and W, 4.8+2×m to 5.9+2×m at % of B wherein m is at % of element $M_2$, up to 10 at % of Co, up to 0.5 at % of C, up to 1.5 at % of O, up to 0.5 at % of N, and the balance of Fe, and comprising a main phase containing an intermetallic compound $R_2(Fe,(Co))_{14}B$ and a grain boundary phase, wherein
the grain boundary phase includes an intergranular grain boundary which includes narrow portions each having an intergranular width of up to 10 nm and broad portions each of which is flanked by the narrow portions and has an intergranular width broader than the intergranular width of the narrow portion,
the broad portion has an intergranular width of at least 30 nm,
the broad portion has an atomic ratio (Fe/R) of Fe to R of 0.01 to 2.5,
the main phase contains an HR rich phase of $(R',HR)_2(Fe,(Co))_{14}B$ at its surface portion, wherein R' is one or more elements selected from rare earth elements inclusive of yttrium and exclusive of Dy, Tb and Ho, and essentially contains Nd, and HR is at least one element selected from Dy, Tb and Ho, the HR rich phase having a higher HR content than the HR content of the main phase other than the surface portion.

2. The R—Fe—B base sintered magnet of claim 1 wherein the broad portion has a ratio (L/W) of up to 8 of the maximum length L in the extending direction of the intergranular grain boundary to the intergranular width W.

3. The R—Fe—B base sintered magnet of claim 1 wherein the broad portion has a maximum cross-sectional area of at least 7,000 nm$^2$.

4. The R—Fe—B base sintered magnet of claim 1 wherein as viewed in a cross section of the magnet, a proportion of the total area of the broad portions relative to the overall area of the magnet is at least 0.1%.

5. The R—Fe—B base sintered magnet of claim 1 wherein the magnet has a HR content distributed from a surface portion toward the interior, the HR content of the surface portion being higher than the HR content of the interior.

6. The R—Fe—B base sintered magnet of claim 1 wherein the HR rich phase has a non-uniform thickness in the surface portion of the main phase.

7. The R—Fe—B base sintered magnet of claim 1 wherein the Nd content of the HR rich phase is up to 0.8 time the Nd content of the main phase at its center.

8. The R—Fe—B base sintered magnet of claim 1 wherein as viewed in a cross section at a depth of 200 μm from the surface of the sintered magnet, the area of the HR rich phase is at least 2% of the overall area of the main phase.

9. A method for preparing the R—Fe—B base sintered magnet according to claim 1, comprising the steps of: providing an alloy fine powder having a composition consisting essentially of 12 to 17 at % of R which is two or more elements selected from . . . and cooling to a temperature of 300° C. or below.

\* \* \* \* \*